Aug. 30, 1938.　　　A. FABIAN　　　2,128,808
ANIMAL TRAP
Filed Aug. 15, 1936　　　2 Sheets-Sheet 1
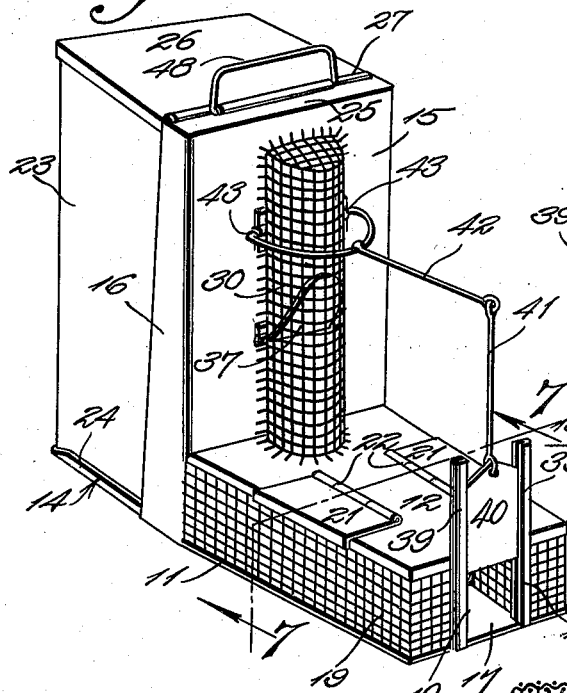
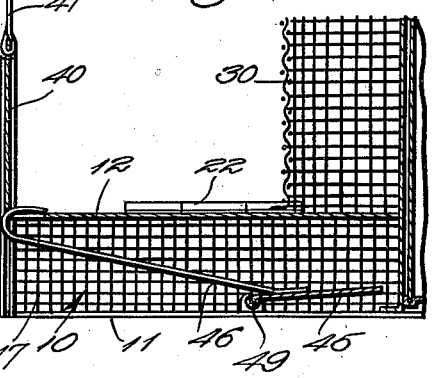
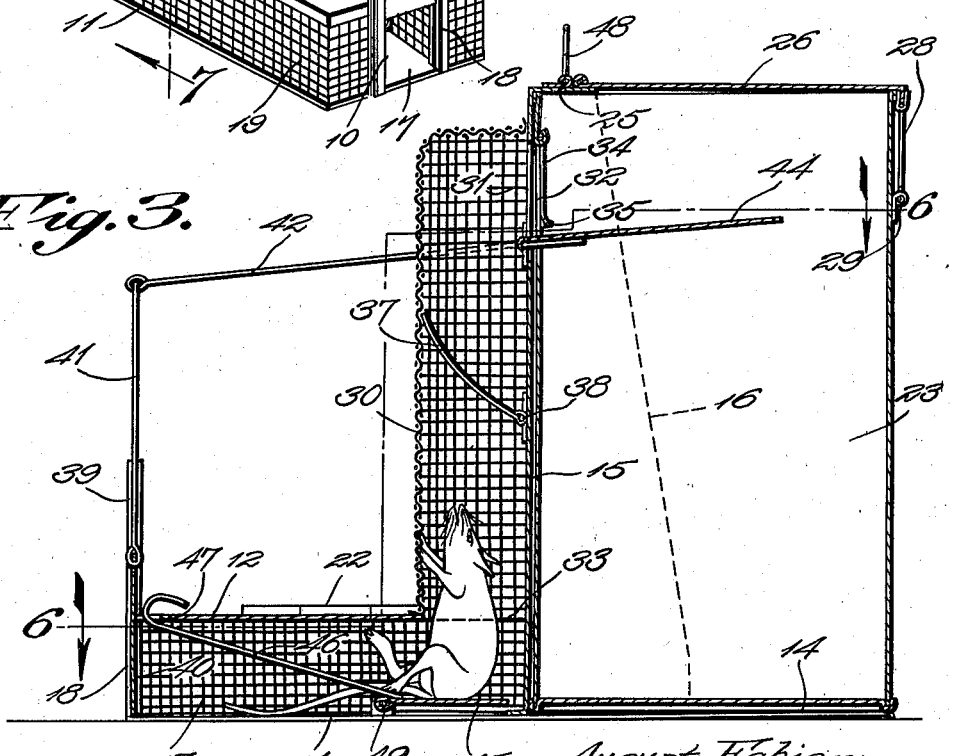
August Fabian
INVENTOR
BY Victor J. Evans & Co.
ATTORNEYS
WITNESS Aug. 30, 1938.     A. FABIAN     2,128,808
ANIMAL TRAP
Filed Aug. 15, 1936     2 Sheets-Sheet 2
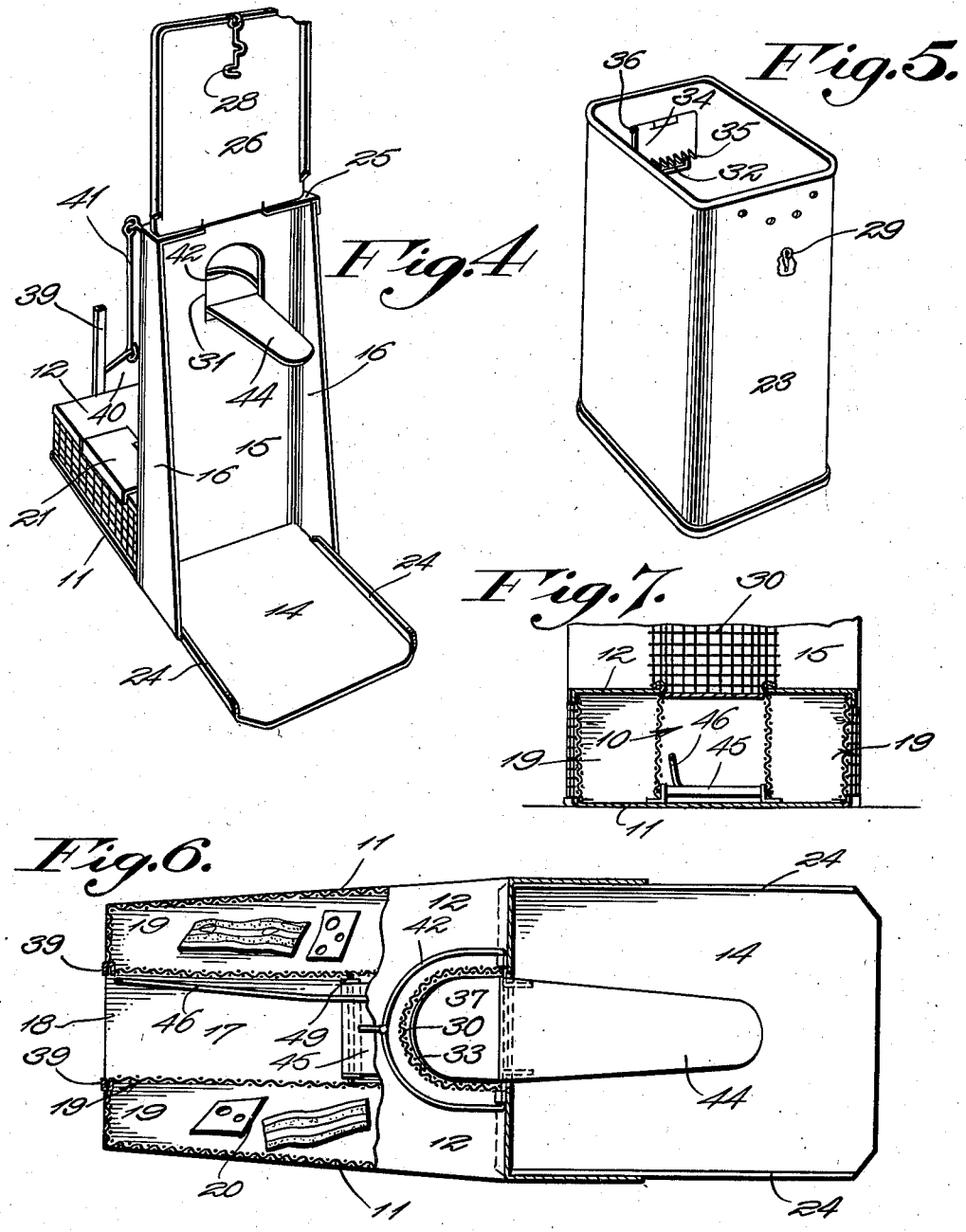
August Fabian
INVENTOR
BY Victor J. Evans & Co.
ATTORNEYS
WITNESS Patented Aug. 30, 1938

2,128,808

UNITED STATES PATENT OFFICE 2,128,808

ANIMAL TRAP

August Fabian, New York, N. Y.

Application August 15, 1936, Serial No. 96,265

1 Claim. (Cl. 43—76)

The invention relates to an animal trap and more especially to rat traps.

The primary object of the invention is the provision of a trap of this character, wherein rodents or other animals can be caught and on entrance to the trap will be drowned, the same being enticed by bait which is disposed in a novel manner with respect to the entrance of the trap and for assuring the enticing of the animals for entrance to the trap.

Another object of the invention is the provision of a trap of this character, wherein the same resets itself after the catching of an animal, the drowned animal being readily removable from the trap and the working of such trap being automatic.

A still further object of the invention is the provision of a trap of this character, wherein the construction thereof is novel in form so that it will successfully entrap and destroy mice, rats or other animals and such trap being thoroughly sanitary as it can be cleaned readily and is entirely automatic in the working thereof.

A still further object of the invention is the provision of a trap of this character, which is simple in its construction, thoroughly reliable and efficient in its operation, novel in its make-up, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a perspective view of the trap constructed in accordance with the invention and set for the catching of a rodent.

Figure 2 is a fragmentary vertical longitudinal sectional view thereof.

Figure 3 is a complete vertical longitudinal sectional view through the trap showing the same entrapping an animal.

Figure 4 is a perspective view looking toward the rear of the trap with the water container removed.

Figure 5 is a perspective view of the water container.

Figure 6 is a sectional view on the line 6—6 of Figure 3 looking in the direction of the arrows.

Figure 7 is a sectional view on the line 7—7 of Figure 1 looking in the direction of the arrows.

Similar reference characters indicate corresponding parts throughout the several views in the drawings.

Referring to the drawings in detail, the trap comprises an entrance cage 10 which is of tapered formation longitudinally thereof and is made with a solid base 11 and a solid top 12, respectively, while the vertical walls 13 are of wire mesh or wire fabric. The base 11 has a rear extension 14 which is separated from the cage 10 by a vertical partition 15 formed with right angular upwardly tapered side wings or flanges 16 which are joined at their lower ends with the base 11, the extension 14 being for a purpose to be presently described.

Formed centrally longitudinally of said cage 10 is an isle or tunnel way 17 which at the outer end thereof forms an entrance 18 while on opposite sides of this isle or tunnel way are bait compartments 19 for accommodating bait 20. The top 12 has hinged thereto doors 21 normally closing openings for access to the compartments 19 so that the bait 20 can be placed within the latter, these doors 21 being hinged at 22 for vertical swinging movement and are normally in closed position.

Removably placed on the rear extension 14 is a substantially rectangular shaped water container 23, being of the same height as the partition 15 and is fitted between side ledges 24 on said extensions 14 and the wings or flanges 16 of said partition. The container 23 is open at its top and is adapted to contain a quantity of water or other liquid for the drowning of rodents dropping into the container.

Arranged at the upper end or top 25 of the partition is a vertically swinging cover 26 for the upper open end of the container 23 when upon the extension 14, the cover being hinged at 27 for vertical swinging thereof and carries a latching hook 28 to engage with a keeper 29 on the said container 23 and in this manner the container is fastened in removably supported position upon the extension 14.

Rising from the top 12 of the cage 10 next to the partition 15 is a vertical column 30 made of wire mesh fabric and this column at its upper end has communication through openings 31 and 32 formed respectively in the partition 15 and the body of the container 23 next thereto while the lower end of this column has communication with the isle or tunnel 17 through an opening 33 formed in the top 12 of said cage thus an animal passing into the tunnel 17 through the entrance 18 will gain entry through the column 30 and openings 31 and 32 into the container 23. Arranged at the opening 32 is a gravitating gate 34 having a saw toothed out-turned lower edge 35, the upper edge being hinged at 36 to the said container 23 and this gate 34 checks the return of the animal from the container 23 to the column 30.

Arranged midway within the column 30 is a check gate 37 which is pivoted at 38 to open upwardly but closes the column on downward movement thereof, the gate 37 being set at an inclination or slope in the direction of the partition 15, being pivoted to the latter. This gate 37 also checks the animal from returning from the column 30 into the cage 10 or tunnel 17 after passing the gate on upward travel of such animal within the column.

On opposite sides of the entrance 18 are vertical guide posts 39 forming tracks for a vertically or perpendicularly slidable trap door 40 which through a link 41 is suspended from a vertically swinging hanger 42 pivoted at 43 to the partition 15 and joined with a depressible tread piece 44 extended through the openings 31 and 32 beneath the gate 34 into the container 23. Thus an animal passing through the openings 31 and 32 will tread upon the piece 44 and by the weight of the animal the door 40 will slide to open position at the entrance 18.

Arranged well within the tunnel 17 is a depressible tread pedal or piece 45 having a forwardly directed rearwardly inclined trigger 46 which plays through a clearance 47 in the top 12 of the cage 10 and this trigger latches the door 40 in an open position. When an animal steps upon the pedal or piece 45 the trigger 46 will release the door 40 which under its own weight will slide to closing position at the entrance 18 and thereby entrapping the animal within the tunnel 17. This animal when within the tunnel 17 seeks outlet from the trap by crawling upwardly in the column 30 and thence through the openings 31 and 32 onto the piece 44 whence by the weight of the animal it will drop into the water contents of the container 23 and become drowned. The weight of the animal upon the piece 44 causes the opening of the door 40 and the trigger 46 then is in a position to latch the said door 40 open so that in this manner the trap is reset so that the trap will be in condition for a second catch or further trapping of animals.

It is preferable to have the top 27 provided with a handle 48 so that the trap can be readily carried in the hand for the placing thereof at any desired locality. The trap can be placed upon a floor, foundation or other support and by sliding the door upwardly this door 40 will be latched in normal open position by the trigger 46.

The pedal is pivoted at 49 to the bottom 11 for vertical swinging movement and becomes tilted by the load thereon. Likewise the piece 44 tilts under a load.

By removing the container 23 it can be dumped for the discharge of the water contents thereof or for removal of the drowned animals as may be contained therein.

When the door 40 closes upon the animal within the tunnel 17 the said animal can not make an escape from the trap and is drowned as before described.

What is claimed is:

A trap of the kind described comprising a cage having a tunnel opening through one end and bait compartments on opposite sides thereof, a partition rising vertically from the cage, an extension at the base of the cage and extended rearwardly of said partition, a liquid container seated upon said extension and open at its top, said container having an entrance port at the upper end thereof, flanges at the sides and top of the partition and coacting with the extension for interfitting of the container with the partition and separable seating thereof, a cover hinged to the partition and closing the open top of the container, a column rising from the cage and having communication with the port of said container and said tunnel, respectively, a door controlling the tunnel at the end opening through the cage, a tread pedal at the point of communication of the column with the said container and having connection with the door for the opening thereof when the pedal is loaded, pedal operated means within the tunnel and having a trigger for latching the door in open position and releasing the door when the pedal is subjected to a load, and a gravity operated gate pivotally connected to said container for closing said port to prevent an animal entrapped within said container from passing through said port after said container has been disengaged from said partition.

AUGUST FABIAN.